United States Patent
Oliver

(10) Patent No.: US 9,811,345 B2
(45) Date of Patent: Nov. 7, 2017

(54) UTILIZING COMPUTING RESOURCES UNDER A DISABLED PROCESSOR NODE WITHOUT FULLY ENABLING THE DISABLED PROCESSOR NODE

(71) Applicant: LENOVO ENTERPRISE SOLUTIONS (SINGAPORE) PTE. LTD., Singapore (SG)

(72) Inventor: Douglas W. Oliver, Round Rock, TX (US)

(73) Assignee: Lenovo Enterprise Solutions (Singapore) Pte. Ltd., Singapore (SG)

( * ) Notice: Subject to any disclaimer, the term of this patent is extended or adjusted under 35 U.S.C. 154(b) by 0 days.

(21) Appl. No.: 14/688,012

(22) Filed: Apr. 16, 2015

(65) Prior Publication Data
US 2016/0306664 A1    Oct. 20, 2016

(51) Int. Cl.
| | | |
|---|---|---|
| G06F 9/50 | (2006.01) | |
| G06F 9/46 | (2006.01) | |
| G06F 9/44 | (2006.01) | |
| G06F 1/24 | (2006.01) | |
| G06F 3/06 | (2006.01) | |
| G06F 12/00 | (2006.01) | |

(Continued)

(52) U.S. Cl.
CPC ............. *G06F 9/4401* (2013.01); *G06F 1/24* (2013.01); *G06F 1/3203* (2013.01); *G06F 1/3243* (2013.01); *G06F 1/3287* (2013.01); *G06F 3/06* (2013.01); *G06F 11/00* (2013.01); *G06F 12/00* (2013.01); *Y02B 60/1239* (2013.01); *Y02B 60/1282* (2013.01)

(58) Field of Classification Search
CPC ........ G06F 9/5011; G06F 9/466; G06F 11/00; G06F 11/07; G06F 11/0721; G06F 11/0724; G06F 11/0703; G06F 11/0727; G06F 11/1641; G06F 11/1645; G06F 11/1658; G06F 11/181; G06F 11/2017; Y02B 60/50; G11C 7/225; G11C 8/18
USPC .................. 718/104; 714/E11.084, E11.071, 714/E11.054, E11.021, E11.001, 12, 11, 714/10, 3, 2, 1, 5; 713/323; 712/E9.06; 711/148
See application file for complete search history.

(56) References Cited

U.S. PATENT DOCUMENTS 6,594,785 B1 * 7/2003 Gilbertson .......... G06F 11/0712
                                                                    714/31
7,000,140 B2 * 2/2006 Okubo .................. G06F 1/3203
                                                                    713/324

(Continued)

OTHER PUBLICATIONS

Dell, "PowerEdge Memory", dell.com (online), accessed Mar. 3, 2015, 2 pages, URL: dell.com/learn/us/en/04/campaigns/poweredge-memory?c=us&l=en&s=bsd&cs=04&delphi:gr=true.

*Primary Examiner* — Abu Ghaffari
(74) *Attorney, Agent, or Firm* — Brandon C. Kennedy; Jason A. Friday; Kennedy Lenart Spraggins LLP

(57) ABSTRACT

Utilizing computing resources under a disabled processor node, including: identifying a disabled processor node, the disabled processor node representing a computer processor that is not being utilized for general purpose computer program instruction execution; identifying one or more computing resources that can be accessed only by the disabled processor node; and enabling a portion of the disabled processor node required to access the one or more computing resources.

13 Claims, 5 Drawing Sheets

(51) Int. Cl.
*G06F 1/32* (2006.01)
*G06F 11/00* (2006.01)

(56) References Cited

U.S. PATENT DOCUMENTS

| | | | | |
|---|---|---|---|---|
| 7,103,808 | B2* | 9/2006 | Kitamorn | G06F 11/0712 714/43 |
| 7,487,222 | B2* | 2/2009 | Begun | G06F 15/16 709/208 |
| 7,900,205 | B2* | 3/2011 | Abe | G06F 9/4843 714/1 |
| 8,078,907 | B2* | 12/2011 | Donlin | G06F 11/2028 714/13 |
| 8,402,259 | B2* | 3/2013 | Sainath | G06F 11/106 713/1 |
| 8,429,387 | B2 | 4/2013 | Zimmer et al. | |
| 8,745,427 | B2* | 6/2014 | Ganesan | G06F 1/3225 711/105 |
| 8,892,803 | B2* | 11/2014 | Lee | G06F 13/24 710/262 |
| 9,268,662 | B2* | 2/2016 | Rao | G06F 11/1484 |
| 9,400,678 | B2* | 7/2016 | Candelaria | G06F 9/468 |
| 9,405,640 | B2* | 8/2016 | Sreenivasan | H04L 69/40 |
| 2004/0153750 | A1* | 8/2004 | Aino | G06F 11/1658 714/11 |
| 2007/0101193 | A1* | 5/2007 | Johnson | G06F 1/26 714/25 |
| 2007/0168695 | A1* | 7/2007 | Chen | G06F 11/0793 714/4.2 |
| 2008/0077536 | A1* | 3/2008 | Boonie | G06F 9/5011 705/80 |
| 2008/0270610 | A1* | 10/2008 | John | G06F 17/30017 709/226 |
| 2009/0024715 | A1* | 1/2009 | Ayyar | G06F 13/4081 709/215 |
| 2010/0217964 | A1* | 8/2010 | Peterka | G01B 31/318555 713/2 |
| 2012/0100895 | A1* | 4/2012 | Priyantha | H04W 52/0293 455/574 |
| 2013/0290759 | A1* | 10/2013 | Kumar | G06F 1/3275 713/323 |
| 2013/0318498 | A1* | 11/2013 | Mittal | G06F 11/366 717/124 |
| 2014/0095912 | A1* | 4/2014 | Hurd | G06F 1/3234 713/323 |
| 2014/0282501 | A1* | 9/2014 | Zeng | G06F 9/45545 718/1 |

* cited by examiner

UTILIZING COMPUTING RESOURCES UNDER A DISABLED PROCESSOR NODE WITHOUT FULLY ENABLING THE DISABLED PROCESSOR NODE

BACKGROUND OF THE INVENTION

Field of the Invention

The field of the invention is data processing, or, more specifically, methods, apparatuses, and products for utilizing computing resources under a disabled processor node.

Description of Related Art

Modern computing systems can frequently include a plurality of computer processors. Each computer processor may be attached to dedicated memory modules or dedicated input/output ('I/O') devices that are designated for exclusive use by a single computer processor. When a particular computer processor fails, is removed, or is otherwise unavailable, the dedicated memory modules or dedicated input/output ('I/O') devices that are designated for exclusive use by the single computer processor also become unavailable, in spite of the fact that the dedicated memory modules or dedicated I/O devices may be perfectly functional.

SUMMARY OF THE INVENTION

Methods, apparatuses, and products for utilizing computing resources under a disabled processor node, including: identifying a disabled processor node, the disabled processor node representing a computer processor that is not being utilized for general purpose computer program instruction execution; identifying one or more computing resources that can be accessed only by the disabled processor node; and enabling a portion of the disabled processor node required to access the one or more computing resources.

The foregoing and other objects, features and advantages of the invention will be apparent from the following more particular descriptions of example embodiments of the invention as illustrated in the accompanying drawings wherein like reference numbers generally represent like parts of example embodiments of the invention.

DETAILED DESCRIPTION OF EXAMPLE EMBODIMENTS

Figure 1:
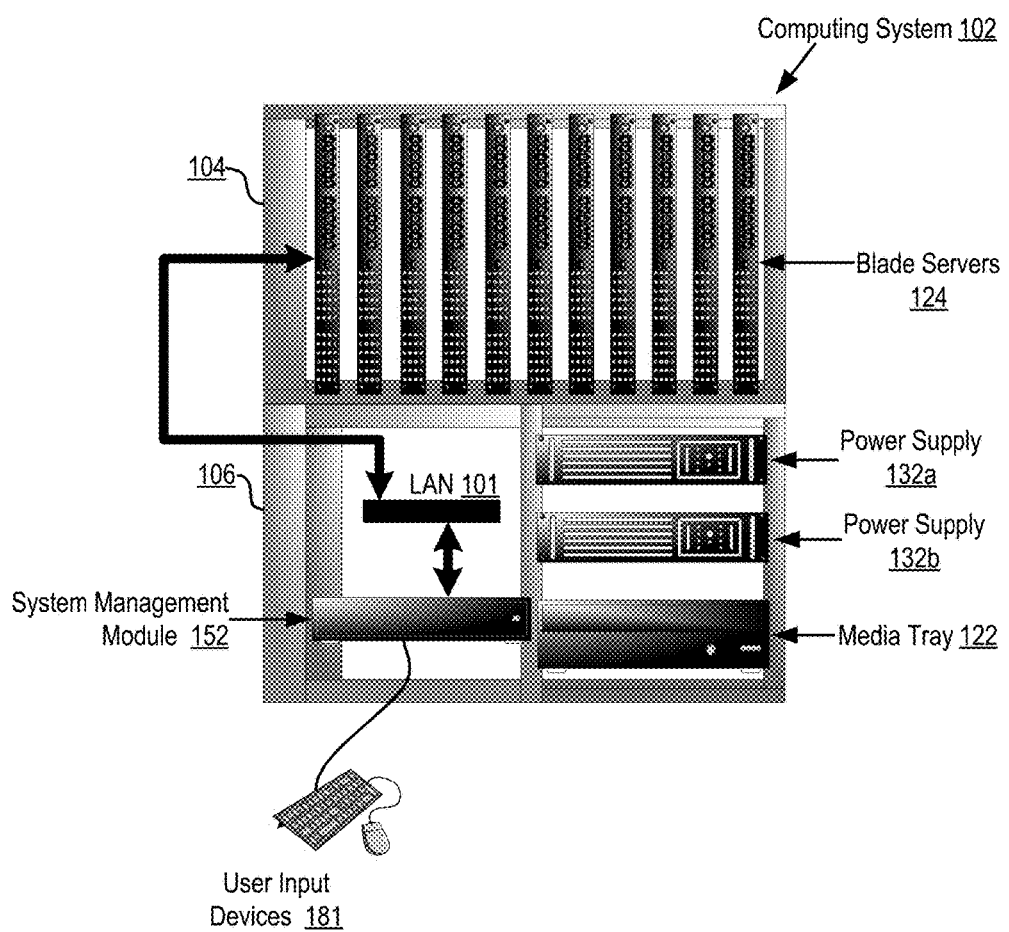
FIG. 1 sets forth a diagram of an example computing system in which computing resources under a disabled processor node may be utilized according to embodiments of the present invention.

Example methods, apparatuses, and products for utilizing computing resources under a disabled processor node in accordance with the present invention are described with reference to the accompanying drawings, beginning with FIG. 1. FIG. 1 sets forth a diagram of an example computing system (102) in which computing resources under a disabled processor node may be utilized according to embodiments of the present invention. The computing system (102) of FIG. 1 includes a plurality of integrated technology elements ('ITEs') that can receive power from a plurality of power supplies (132a, 132b). Each ITE represents a computing component such as a storage device, a blower, a blade server (124), or other power consuming computing component of the computing system (102).

The ITEs depicted in FIG. 1 can receive power from a plurality of power supplies (132a, 132b). Each power supply (132a, 132b) in FIG. 1 is a device that supplies electric power to an electrical load. Each power supply (132a, 132b) may be embodied, for example, as a switched mode power supply that transfers power from a source such as mains power to a load such as the ITEs, while converting voltage and current characteristics.

The computing system (102) of FIG. 1 is depicted as a chassis environment. A 'chassis environment,' as the term is used in this specification, refers generally to a blade server system. The blade server system in the example depicted in FIG. 1 is installed in a two-bay chassis (104, 106) and includes one or more of blade servers (124), one or more system management modules (152), one or more media trays (122), and one or more power supplies (132a, 132b). The computing system (102) of FIG. 1 therefore includes a plurality of ITEs, illustrated in this example as blade servers (124), the system management module (152), and the media tray (122), although readers will appreciate that in other embodiments additional ITEs may be included in the computing system (102), where each additional ITE can be embodied as any power consuming computing component of the chassis environment.

The system management module (152) of FIG. 1 may be embodied as a computer, including software and hardware components, one or more computer processors and computer memory, that provides system management functions for components in the example chassis environment, including the blade servers (124) and the media tray (122). The system management module (152) of FIG. 1 may also make available connections for user input devices such as mice or keyboards (181) that are not generally connected directly to the blade servers (124) or to the chassis itself.

The computing system (102) of FIG. 1 also includes one or more blade servers (124). The one or more blade servers (124) of FIG. 1 are installed in cabinet bay (104) of the example computing system (102). Such blade servers (124) are computing devices implemented in blade form factor. The blade servers (124) may share access to the media tray (122) and may be connected to one another and to the system management module (152) for data communications through a local area network ('LAN') (101), which may be embodied as a small network installed within the computing system (102).

The computing system (102) of FIG. 1 also includes one or more media trays (122). The one or more media trays (122) in FIG. 1 may house non-volatile memory media generally. A media tray (122) may typically include Compact Disc read-only media drives ('CD-ROM'), Digital Video Disc ROM drives (DVD-ROM), CD-RW drives, DVD-RW drives, floppy disk drives, and so on as will occur to those of skill in the art.

The arrangement of the chassis environment, network (101), and other devices making up the example computing system (102) illustrated in FIG. 1 are for explanation, not for limitation. Computing systems useful according to various embodiments of the present invention may include additional servers, routers, and other devices, not shown in FIG. 1, as will occur to those of skill in the art. Networks in such data processing systems may support many data communications protocols, including Transmission Control Protocol ('TCP'), Internet Protocol ('IP'), HyperText Transfer Protocol ('HTTP'), Wireless Access Protocol ('WAP'), Handheld Device Transport Protocol ('HDTP'), and others as will occur to those of skill in the art. Various embodiments of the present invention may be implemented on a variety of hardware platforms in addition to those illustrated in FIG. 1.

Figure 2:
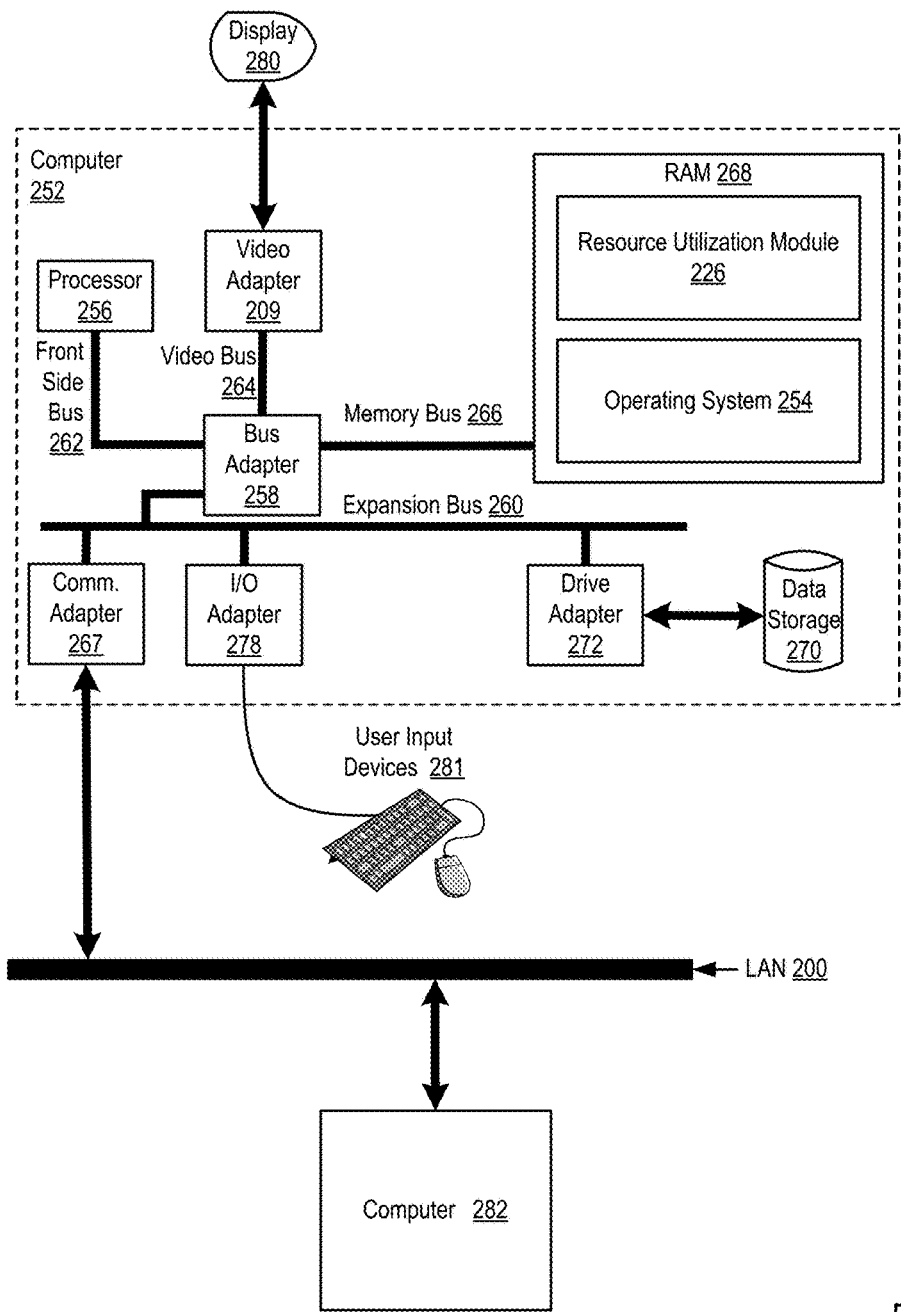
FIG. 2 sets forth a block diagram of automated computing machinery comprising an example computer useful in utilizing computing resources under a disabled processor node according to embodiments of the present invention.

For further explanation, FIG. 2 sets forth a block diagram of automated computing machinery comprising an example computer (252) useful in utilizing computing resources under a disabled processor node according to embodiments of the present invention. The computer (252) of FIG. 2 includes at least one computer processor (256) or 'CPU' as well as random access memory (268) ('RAM') which is connected through a high speed memory bus (266) and bus adapter (258) to processor (256) and to other components of the computer (252).

Stored in RAM (268) is a resource utilization module (226), a module of computer program instructions for utilizing computing resources under a disabled processor node according to embodiments of the present invention. The resource utilization module (226) may be configured to utilize computing resources under a disabled processor node by identifying a disabled processor node, identifying one or more computing resources that can be accessed only by the disabled processor node, and enabling a portion of the disabled processor node required to access the one or more computing resources, as described in greater detail below.

Also stored in RAM (268) is an operating system (254). Operating systems useful utilizing computing resources under a disabled processor node according to embodiments of the present invention include UNIX™, Linux™, Microsoft XP™, AIX™, IBM's i5/OS™, and others as will occur to those of skill in the art. The operating system (254) and the resource utilization module (226) in the example of FIG. 2 are shown in RAM (268), but many components of such software typically are stored in non-volatile memory also, such as, for example, on a disk drive (270). The computer (252) of FIG. 2 includes disk drive adapter (272) coupled through expansion bus (260) and bus adapter (258) to processor (256) and other components of the computer (252). Disk drive adapter (272) connects non-volatile data storage to the computer (252) in the form of disk drive (270). Disk drive adapters useful in computers for utilizing computing resources under a disabled processor node according to embodiments of the present invention include Integrated Drive Electronics ('IDE') adapters, Small Computer System Interface ('SCSI') adapters, and others as will occur to those of skill in the art. Non-volatile computer memory also may be implemented for as an optical disk drive, electrically erasable programmable read-only memory (so-called 'EEPROM' or 'Flash' memory), RAM drives, and so on, as will occur to those of skill in the art.

The example computer (252) of FIG. 2 includes one or more input/output ('I/O') adapters (278). I/O adapters implement user-oriented input/output through, for example, software drivers and computer hardware for controlling output to display devices such as computer display screens, as well as user input from user input devices (281) such as keyboards and mice. The example computer (252) of FIG. 2 includes a video adapter (209), which is an example of an I/O adapter specially designed for graphic output to a display device (280) such as a display screen or computer monitor. Video adapter (209) is connected to processor (256) through a high speed video bus (264), bus adapter (258), and the front side bus (262), which is also a high speed bus.

The example computer (252) of FIG. 2 includes a communications adapter (267) for data communications with other computers (282) and for data communications with a data communications network (200). Such data communications may be carried out serially through RS-232 connections, through external buses such as a Universal Serial Bus ('USB'), through data communications networks such as IP data communications networks, and in other ways as will occur to those of skill in the art. Communications adapters implement the hardware level of data communications through which one computer sends data communications to another computer, directly or through a data communications network. Examples of communications adapters useful for utilizing computing resources under a disabled processor node according to embodiments of the present invention include modems for wired dial-up communications, Ethernet (IEEE 802.3) adapters for wired data communications network communications, and 802.11 adapters for wireless data communications network communications.

Figure 3:
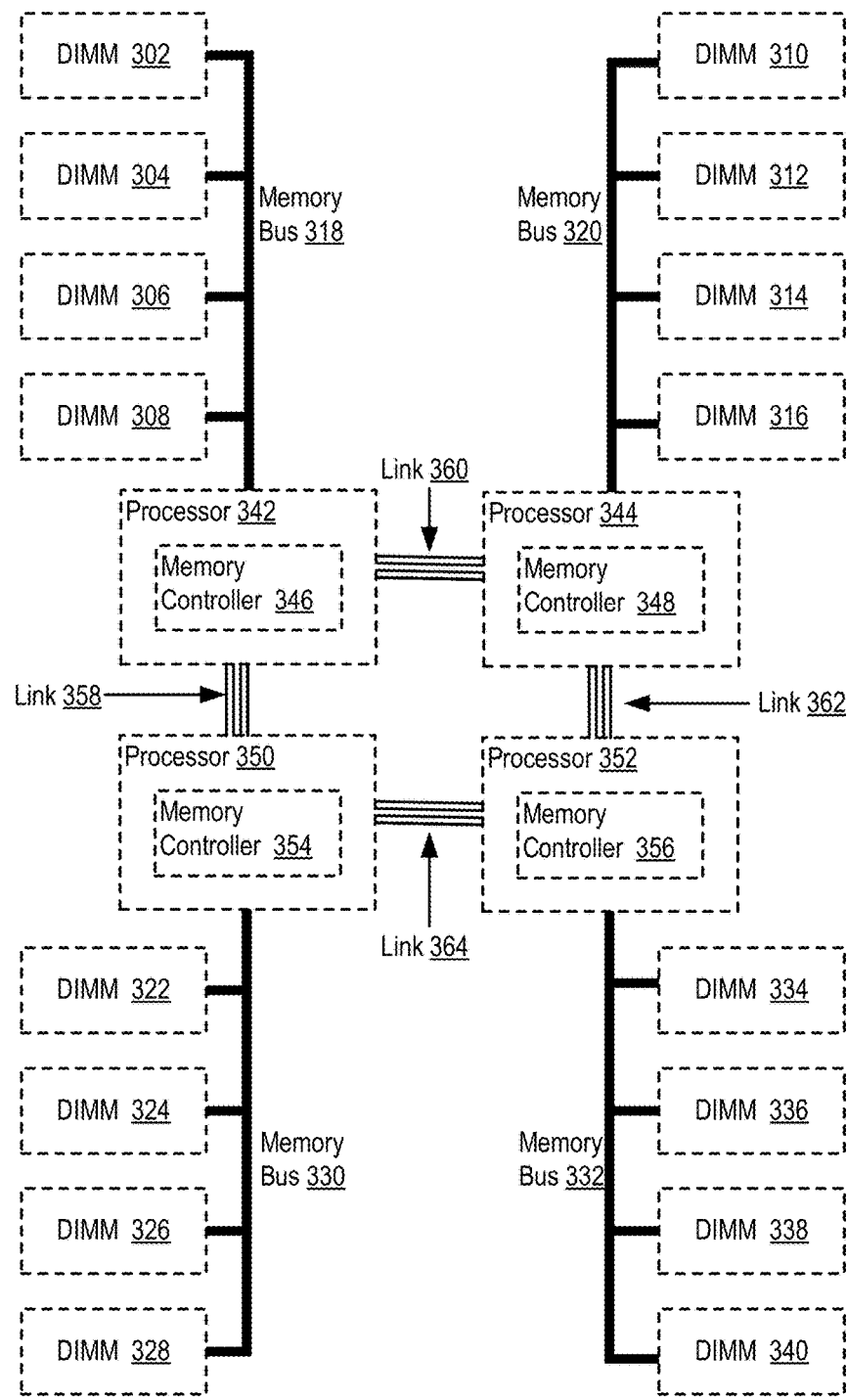
FIG. 3 sets forth a block diagram illustrating a plurality of processor nodes and computing resources that can be accessed only by one processing node according to embodiments of the present invention.

For further explanation, FIG. 3 sets forth a block diagram illustrating a plurality of processor nodes and computing resources that can be accessed only by one processing node according to embodiments of the present invention. In the example depicted in FIG. 3, the processor nodes are embodied as computer processors, including a first processor (342), a second processor (344), a third processor (350), and a fourth processor (352). Each of the processors (342, 344, 350, 352) may be configured for inter-processor communications over data communications links (358, 360, 362, 364), such as a PCI Express ('PCIe') Non-Transparent Bridging ('NTB') link. Although the example depicted in FIG. 3 only illustrates four data communications links (358, 360, 362, 364) between the processors (342, 344, 350, 352), readers will appreciate that each processor (342, 344, 350, 352) may be communicatively coupled to all other processors (342, 344, 350, 352) in the computing system via such data communications links (358, 360, 362, 364).

Each of the processors (342, 344, 350, 352) depicted in FIG. 3 includes a memory controller (346, 348, 354, 356). Each of the memory controllers (346, 348, 354, 356) may be embodied as a digital circuit that manages the flow of data going to and from memory. Although each of the memory controllers (346, 348, 354, 356) can be a separate chip, the memory controllers (346, 348, 354, 356) depicted in FIG. 3 are embodied as an integrated memory controllers ('IMCs') that are integrated into a processor (346, 348, 354, 356).

The exampled depicted in FIG. 3 also includes a plurality of Dual In-Line Memory Modules ('DIMMs') (302, 304, 306, 308, 310, 312, 314, 316, 322, 324, 326, 328, 334, 336, 338, 340). Each of the DIMMs (302, 304, 306, 308, 310, 312, 314, 316, 322, 324, 326, 328, 334, 336, 338, 340) may include non-volatile computer memory such as Synchronous Dynamic Random Access Memory ('SDRAM') and may further be communicatively coupled to a processor (342, 344, 350, 352) via a memory bus (318, 320, 330, 332). Such memory buses (318, 320, 330, 332) may be single channel busses or multichannel busses according to embodiments of the present invention. Readers will appreciate that in the example depicted in FIG. 4, each of the DIMMs (302, 304, 306, 308, 310, 312, 314, 316, 322, 324, 326, 328, 334, 336, 338, 340) may be directly accessed by one and only one processor (342, 344, 350, 352).

Figure 4:
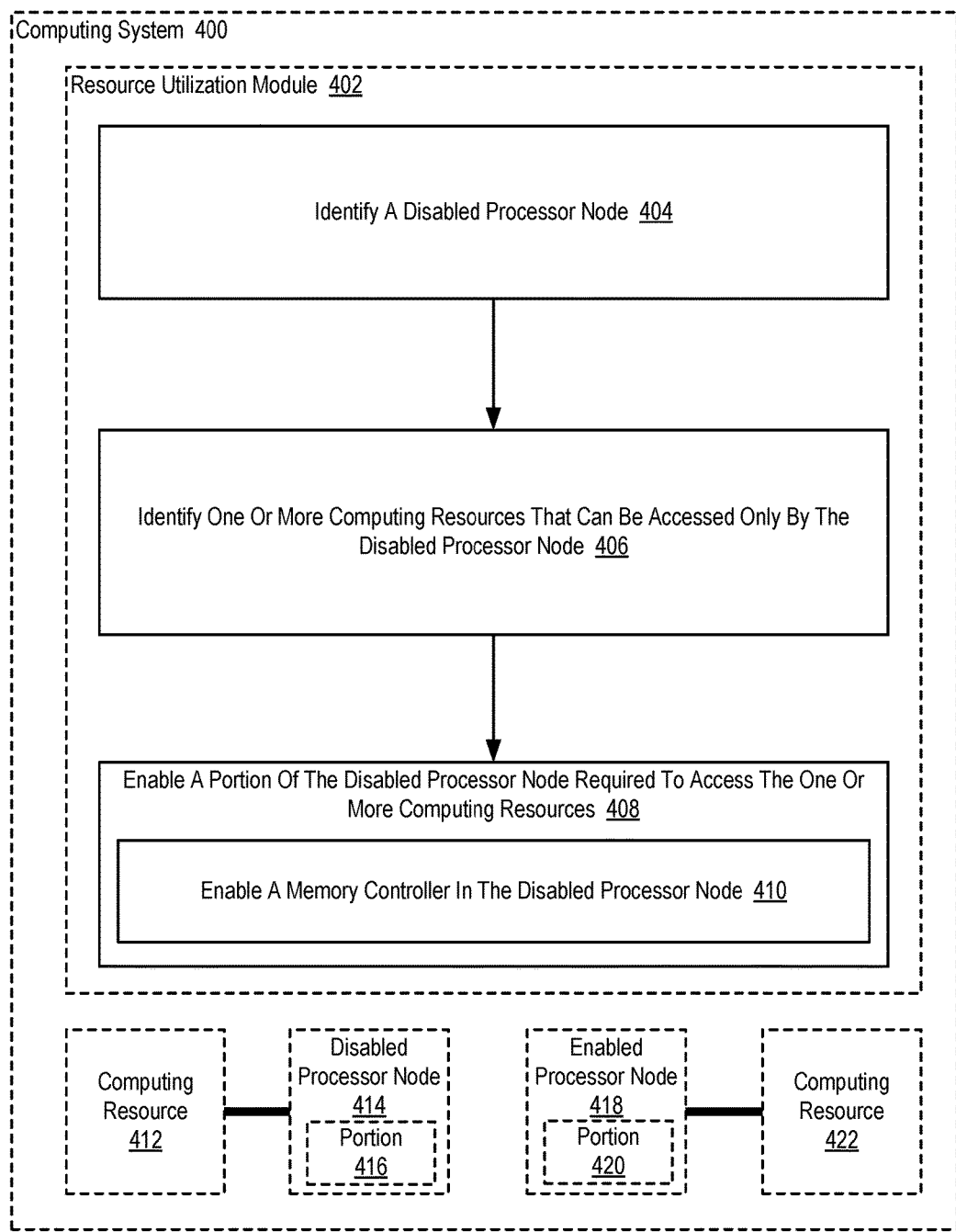
FIG. 4 sets forth a flow chart illustrating an example method for utilizing computing resources under a disabled processor node according to embodiments of the present invention.

For further explanation, FIG. 4 sets forth a flow chart illustrating an example method for utilizing computing resources (412) under a disabled processor node (414) according to embodiments of the present invention. The example method depicted in FIG. 4 is carried out, at least in part, by a resource utilization module (402). The resource utilization module (402) of FIG. 4 may be embodied, for example, as a module of computer program instructions executing on computer hardware such as a computer processor.

The example method depicted in FIG. 4 includes identifying (404) a disabled processor node (414). The disabled processor node (414) of FIG. 4 may represent a computer processor that is not being utilized for general purpose computer program instruction execution. As such, an operating system may not be sending instructions to the disabled processor node (414) for execution. Although the processor node (414) is disabled, the disabled processor node (414) may be fully functional computer processor that is not being utilized for general purpose computer program instruction execution to conserve power. Alternatively, the disabled processor node (414) may be a low yield processor that is not capable of delivering the processing power required by fully functional processors in the computing system (400) that are being utilized for general purpose computer program instruction execution.

In the example method depicted in FIG. 4, identifying (404) the disabled processor node (414) may be carried out, for example, by examining system inventory information that identifies each processor in the computing system (400) and comparing such information to information maintained by an operating system that identifies all hardware devices registered with the operating system. In such an example, if system inventory information indicates that there are three processors in the computing system (400) and the information maintained by an operating system indicates that only two computer processors are registered with the operating system, the resource utilization module (402) can determine that one processor is disabled. In fact, by comparing the identities of the processors in the system inventory information to the identities of the computer processors that are registered with the operating system, the disabled processor node (414) may be identified (404).

The example method depicted in FIG. 4 also includes identifying (406) one or more computing resources (412) that can be accessed only by the disabled processor node (414). Computing resources (412) that can be accessed only by the disabled processor node (414) can include, for example, DIMMs inserted into slots that may only be accessed via a computer processor that is located in the processor slot that houses the disabled processor node (414), I/O devices that may only be accessed via a computer processor that is located in the processor slot that houses the disabled processor node (414), and so on. Such dedicated computing resources (412) may only be accessed via a computer processor that is located in the processor slot that houses the disabled processor node (414) because the physical design of a motherboard or other mounting apparatus only provides for data communications busses between the processor slot that houses the disabled processor node (414) and the dedicated computing resources (412)—with no data communications busses coupling the dedicated computing resources (412) to any other processor slots. In the example depicted in FIG. 4, identifying (406) one or more computing resources (412) that can be accessed only by the disabled processor node (414) may be carried out, for example, by examining system inventory information that associates dedicated computing resources with the processor slots that have exclusive access to the dedicated computing resources. Such system inventory information may be maintained, for example, by a system management module, by an operating system, by a dedicated inventory module, and so on.

The example method depicted in FIG. 4 also includes enabling (408) a portion (416) of the disabled processor node (414) that is required to access the one or more computing resources (412). In the example method depicted in FIG. 4, the portion (416) of the disabled processor node (414) that is required to access the one or more computing resources (412) may be embodied, for example, as an on-chip memory controller that is used to access dedicated memory that is communicatively coupled to the disabled processor node (414). As such, enabling (408) the portion (416) of the disabled processor node (414) that is required to access the one or more computing resources (412) can include enabling (410) a memory controller in the disabled processor node (414). Enabling (410) a memory controller in the disabled processor node (414) may be carried out, for example, through the use of a processor-supported feature-on-demand function. The processor-supported feature-on-demand function may allow certain components of the disabled processor node (414) to be enabled without fully enabling the entire disabled processor node (414). In such a way, sub-components of the disabled processor node (414) such as an on-chip memory controller may be enabled in spite of the fact that the entire processor node is not enabled.

The computing system (400) depicted in FIG. 4 also includes an enabled processor node (418) that also includes a portion (420) that is used to access a computing resource (422) that can only be accessed through the enabled processor node (418). Readers will appreciate that the computing resource (422) that is communicatively coupled to the enabled processor node (418) cannot be accessed directly by the disabled processor node (414). Likewise, the computing resource (412) that is communicatively coupled to the disabled processor node (414) cannot be accessed directly by the enabled processor node (418).

Figure 5:
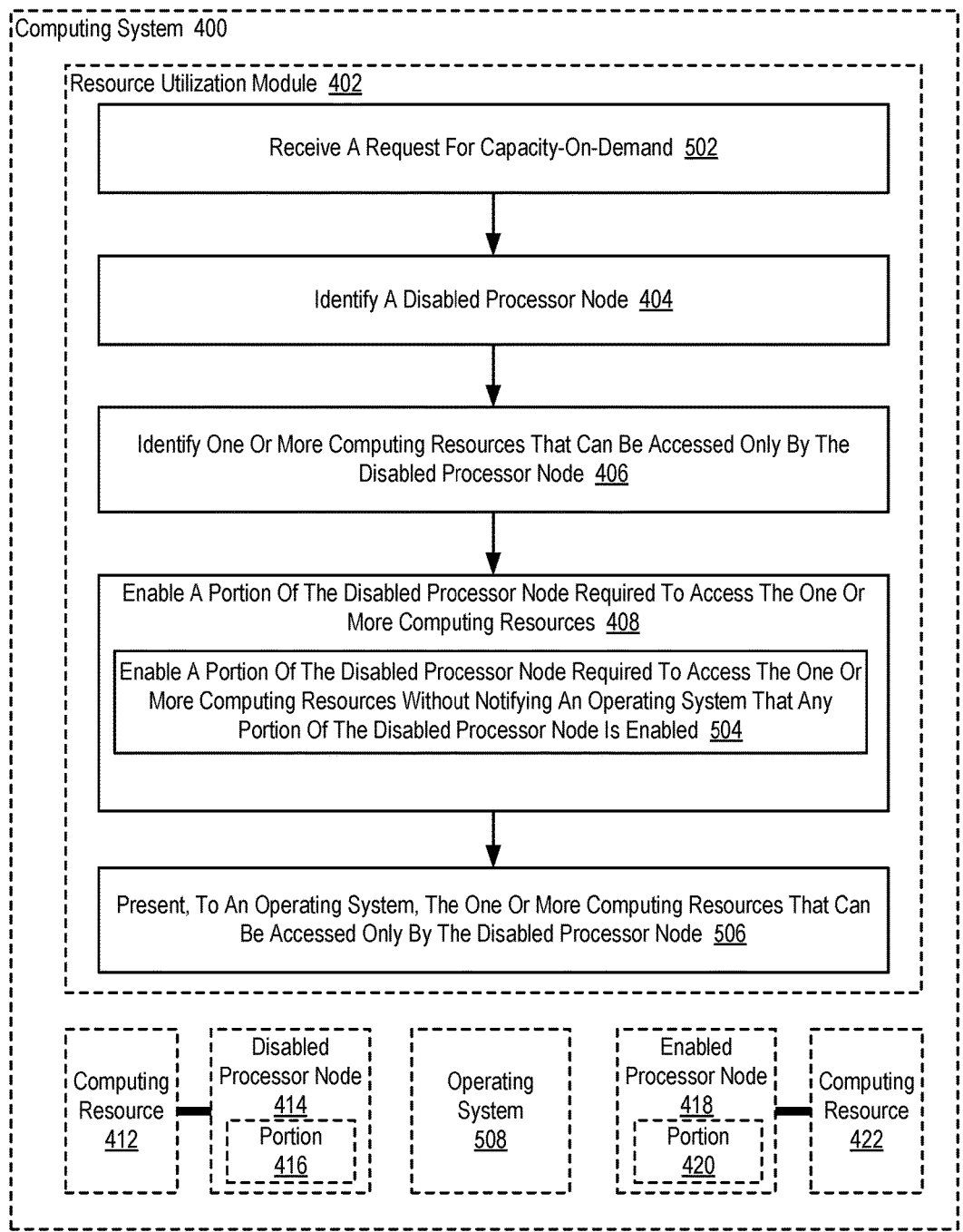
FIG. 5 sets forth a flow chart illustrating an additional example method for utilizing computing resources under a disabled processor node according to embodiments of the present invention.

For further explanation, FIG. 5 sets forth a flow chart illustrating an additional example method for utilizing computing resources under a disabled processor node (414) according to embodiments of the present invention. The example method depicted in FIG. 5 is similar to the example method depicted in FIG. 4, as the example method depicted in FIG. 5 also includes identifying (404) a disabled processor node (414), identifying (406) one or more computing resources (412) that can be accessed only by the disabled processor node (414), and enabling (408) a portion (416) of the disabled processor node (414) required to access the one or more computing resources (412).

The example method depicted in FIG. 5 also includes receiving (502) a request for capacity-on-demand. In the example method depicted in FIG. 5, the disabled processor node (414) and the one or more computing resources (412) that are accessed through the disabled processor node (414) may be part of a computing system (400) that can offer capacity-on-demand to a user of the computing system. Capacity-on-demand may be offered as a service provided by the computing system (400) that enables a user of the computing system (400) to request, and have granted access to, additional computing resources such as additional memory, processing resources, and the like. In response to receiving (502) a request for capacity-on-demand, the resource utilization module (402) can identify (404) a disabled processor node (414), identify (406) one or more computing resources (412) that can be accessed only by the disabled processor node (414), and enable (408) a portion (416) of the disabled processor node (414) required to access the one or more computing resources (412), as described herein.

In the example method depicted in FIG. 5, enabling (408) a portion (416) of the disabled processor node (414) required to access the one or more computing resources (412) is carried out without (504) notifying an operating system (508) that any portion of the disabled processor node is enabled. The operating system (508) of FIG. 5 may maintain a table, list, or other data structure that identifies all active devices in the computing system (400). As such, enabling (408) the portion (416) of the disabled processor node (414) that is required to access the one or more computing resources (412) without (504) notifying an operating system (508) that any portion of the disabled processor node is enabled may be carried out, for example, by preventing an entry for the disabled processor node (414) from being added to the data structure that identifies all active devices in the computing system (400).

The example method depicted in FIG. 5 also includes presenting (506), to an operating system (508), the one or more computing resources (412) that can be accessed only by the disabled processor node (414). As described above, the operating system (508) of FIG. 5 may maintain a table, list, or other data structure that identifies all active devices in the computing system (400). As such, presenting (506) the one or more computing resources (412) that can be accessed only by the disabled processor node (414) to the operating system (508) may be carried out, for example, by having an entry for the one or more computing resources (412) that can be accessed only by the disabled processor node (414) added to the data structure that identifies all active devices in the computing system (400).

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It will be understood from the foregoing description that modifications and changes may be made in various embodiments of the present invention without departing from its true spirit. The descriptions in this specification are for purposes of illustration only and are not to be construed in a limiting sense. The scope of the present invention is limited only by the language of the following claims.

What is claimed is:

1. A method comprising:
by first program instructions on a first computing device of a computing system,
identifying a disabled processor node in the computing system, wherein the disabled processor node is installed, functional, and unutilized;
identifying one or more computing resources in the computing system that can be accessed only by the disabled processor node while the disabled processor node is enabled in the computing system; and
enabling one or more components of the disabled processor node required to access the one or more computing resources by enabling certain components including a memory controller of the disabled processor node without fully enabling the entire disabled processor node and without notifying an operating system of the computing system that any component of the disabled processor node in the computing system is enabled; and
wherein enabling the one or more components of the disabled processor node that is required to access the one or more computing resources includes preventing an entry for the disabled processor node from being added to a data structure that identifies all active devices in the computing system.

2. The method of claim 1 further comprising presenting, to the operating system of the computing system, the one or more computing resources that can be accessed only by the disabled processor node.

3. The method of claim 2 wherein presenting, to the operating system of the computing system, the one or more computing resources that can be accessed only by the disabled processor node further includes adding an entry for the one or more computing resources that can be accessed only by the disabled processor node to the data structure that identifies all active devices in the computing system.

4. The method of claim 1 further comprising:
receiving a request for capacity-on-demand, the request for capacity-on-demand requesting additional computing resources in the computing system; and
in response to receiving the request for capacity-on-demand, enabling the one or more components of the disabled processor node required to access the additional computing resources.

5. The method of claim 1 wherein the one or more computing resources that can be accessed only by the disabled processor node in the computing system include one of more dual in-line memory modules ('DIMMs').

6. An apparatus comprising:
a computer processor of a computing system; and
a computer memory operatively coupled to the computer processor, the computer memory having disposed within it computer program instructions that, when executed by the computer processor, cause the apparatus to carry out the steps of:
identifying a disabled processor node in the computing system, wherein the disabled processor node is installed, functional, and unutilized;
identifying one or more computing resources in the computing system that can be accessed only by the disabled processor node while the disabled processor node is enabled in the computing system; and
enabling one or more components of the disabled processor node required to access the one or more computing resources by enabling certain components including a memory controller of the disabled processor node without fully enabling the entire disabled processor node and without notifying an operating system of the computing system that any component of the disabled processor node in the computing system is enabled; and
wherein enabling the one or more components of the disabled processor node that is required to access the one or more computing resources includes preventing an entry for the disabled processor node from being added to a data structure that identifies all active devices in the computing system.

7. The apparatus of claim 6 further comprising computer program instructions that, when executed by the computer processor, cause the apparatus to carry out the step of presenting, to the operating system of the computing system, the one or more computing resources that can be accessed only by the disabled processor node.

8. The apparatus of claim 6 further comprising computer program instructions that, when executed by the computer processor, cause the apparatus to carry out the steps of:
receiving a request for capacity-on-demand, the request for capacity-on-demand requesting additional computing resources in the computing system; and
in response to receiving the request for capacity-on-demand, enabling the one or more components of the disabled processor node required to access the additional computing resources.

9. The apparatus of claim 6 wherein the one or more computing resources that can be accessed only by the disabled processor node in the computing system include one of more dual in-line memory modules ('DIMMs').

10. A computer program product comprising:

one or more computer-readable storage media and computer program instructions stored on the one or more computer-readable storage media, wherein the one or more computer-readable storage media is not a signal, the computer program instructions comprising:
 computer program instructions to identify a disabled processor node in a computing system, wherein the disabled processor node is installed, functional, and unutilized;
 computer program instructions to identify one or more computing resources in the computing system that can be accessed only by the disabled processor node while the disabled processor node is enabled in the computing system; and
 computer program instructions to enable one or more components of the disabled processor node required to access the one or more computing resources by enabling certain components including a memory controller of the disabled processor node without fully enabling the entire disabled processor node and without notifying an operating system of the computing system that any component of the disabled processor node in the computing system is enabled; and
 wherein enabling the one or more components of the disabled processor node that is required to access the one or more computing resources includes preventing an entry for the disabled processor node from being added to a data structure that identifies all active devices in the computing system.

11. The computer program product of claim 10 further comprising computer program instructions to present, to the operating system of the computing system, the one or more computing resources that can be accessed only by the disabled processor node.

12. The computer program product of claim 10 further comprising computer program instructions:
 to receive a request for capacity-on-demand, requesting additional computing resources in the computing system; and
 in response to receiving the request for capacity-on-demand, to enable the one or more components of the disabled processor node required to access the additional computing resources.

13. The computer program product of claim 10 wherein the one or more computing resources that can be accessed only by the disabled processor node in the computing system include one of more dual in-line memory modules ('DIMMs').

* * * * *